US011762775B2

(12) United States Patent
Russell et al.

(10) Patent No.: US 11,762,775 B2
(45) Date of Patent: *Sep. 19, 2023

(54) SYSTEMS AND METHODS FOR IMPLEMENTING OVERLAPPING DATA CACHING FOR OBJECT APPLICATION PROGRAM INTERFACES

(71) Applicant: INTUIT INC., Mountain View, CA (US)

(72) Inventors: Philip Edward Russell, San Diego, CA (US); Grigoriy E. Kesler, Mountain View, CA (US); Peter A. Vogel, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/504,407

(22) Filed: Oct. 18, 2021

(65) Prior Publication Data

US 2022/0035744 A1   Feb. 3, 2022

Related U.S. Application Data

(63) Continuation of application No. 16/665,367, filed on Oct. 28, 2019, now Pat. No. 11,176,044.

(51) Int. Cl.
*G06F 12/0855* (2016.01)
*G06F 9/54* (2006.01)

(52) U.S. Cl.
CPC .......... *G06F 12/0855* (2013.01); *G06F 9/541* (2013.01); *G06F 2212/1016* (2013.01)

(58) Field of Classification Search
CPC ............ G06F 12/0855; G06F 12/0857; G06F 12/0868; G06F 12/1024; G06F 2212/1016; G06F 8/4442
See application file for complete search history.

(56) References Cited

U.S. PATENT DOCUMENTS

| 10,572,315 | B1 | 2/2020 | Lusk |
| 2017/0346875 | A1 | 11/2017 | Wells |
| 2019/0065500 | A1 | 2/2019 | Martin |
| 2019/0065560 | A1 | 2/2019 | Rojkov |
| 2020/0250095 | A1 | 8/2020 | Chen |
| 2020/0364272 | A1 | 11/2020 | Emminghaus |

*Primary Examiner* — Tracy A Warren
(74) *Attorney, Agent, or Firm* — DLA PIPER LLP (US)

(57) ABSTRACT

Systems and methods that may be used to implement overlapping data caching for object application program interfaces (APIs). A unique identifier may be assigned to each sub-component of an object API request. The unique identifiers may be used to determine if sub-components of one object API request overlaps with a sub-component of a prior different request such that a data response for the prior different request can be retrieved from the cache and used as part of the data response for the current object API request.

20 Claims, 6 Drawing Sheets

SYSTEMS AND METHODS FOR IMPLEMENTING OVERLAPPING DATA CACHING FOR OBJECT APPLICATION PROGRAM INTERFACES

CROSS-REFERENCE TO RELATED APPLICATIONS

The present application is a continuation of U.S. application Ser. No. 16/665,367, filed Oct. 28, 2019, entitled "SYSTEMS AND METHODS FOR IMPLEMENTING OVERLAPPING DATA CACHING FOR OBJECT APPLICATION PROGRAM INTERFACES". The contents of the aforementioned patent application is hereby expressly incorporated by reference in its entirety for all purposes.

DETAILED DESCRIPTION OF SEVERAL EMBODIMENTS

Figure 1:
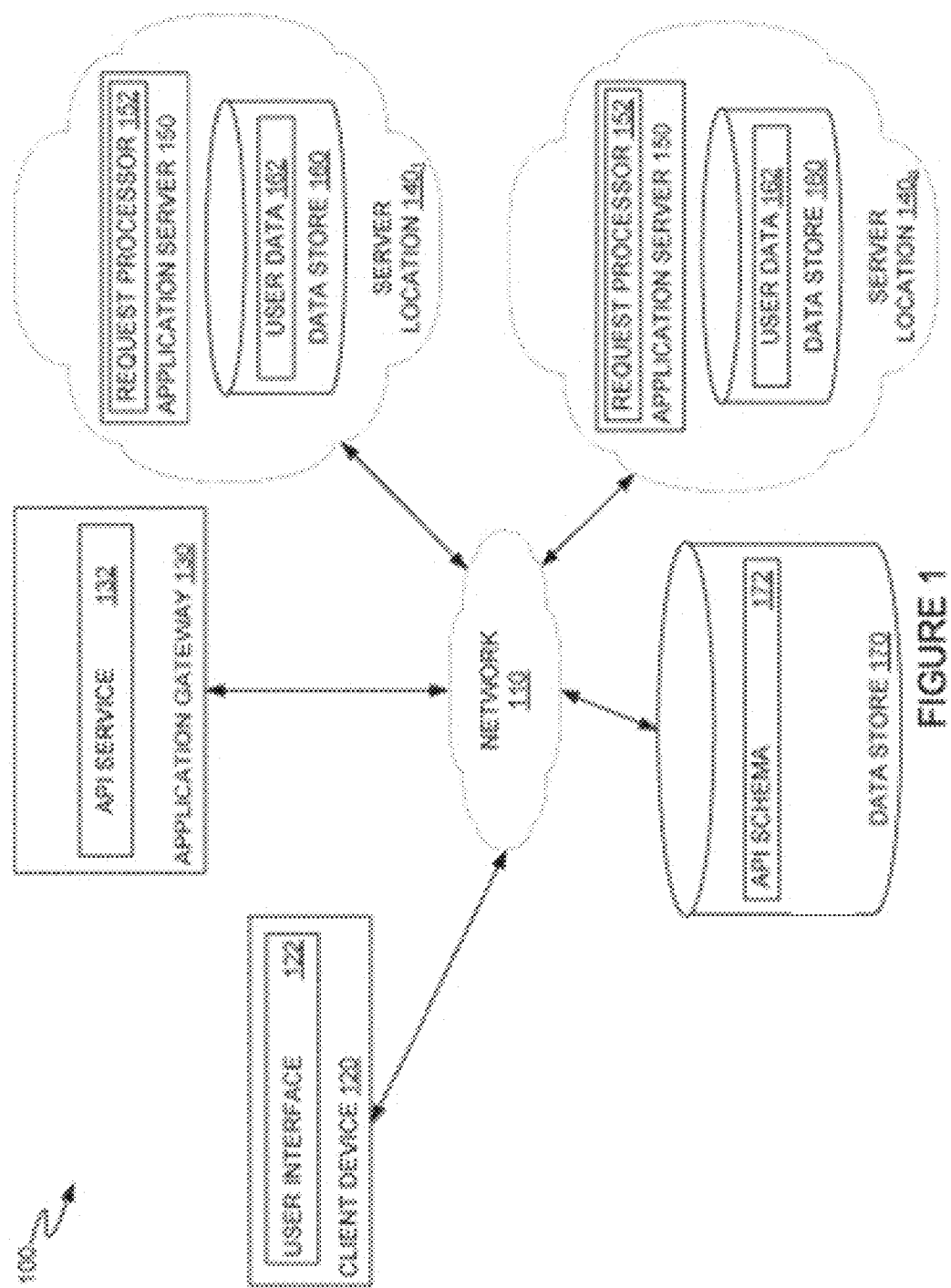
FIG. 1 shows an example of a computing environment configured to implement overlapping data caching for object application program interfaces (APIs) in accordance with an embodiment of the present disclosure.

Embodiments described herein may be used to implement an overlapping data cache and caching scheme for object APIs such that response data overlapping two or more different API requests can be retrieved from the cache. The use of the overlapping cache disclosed herein may avoid unnecessary calls to data services when the response data is already present in the cache as a sub-component of a prior API request.

It is known in that art that application programming interfaces (APIs) generally expose various routines and methods to software developers for use in obtaining and modifying data using features of a software application. APIs may be accessible programmatically (e.g., as function calls in an application or function library) or via a web-service (e.g., WSDL) for web-based applications. Web-based applications can invoke functionality exposed by an API, for example, using a Representational State Transfer function call (a RESTful function call). A RESTful call generally uses HTTP messages to invoke a function exposed by a web-based API and pass data to the invoked function for processing. In other cases, web-based applications can invoke API functions using queries encapsulated in an HTTP POST request, a Simple Object Access Protocol (SOAP) request, according to a web service standard (e.g., WSDL) or according to other protocols that allow client software to invoke functions on a remote system.

A client device typically wants its object API data to be returned as quickly as possible. To this end, the client device and its end user do not want unnecessary calls to third-party data services, as the calls may incur large latency costs. The problem to be solved may be expressed as follows: given object response graphs $\{G1, G2\}$, how can an API system efficiently store their component subgraphs $\{C1, \ldots, CN\}$ in a back-end cache and retrieve the components across multiple requests such that response data overlapping two or more requests can be retrieved from cache instead of a data service? Accordingly, there is a need and desire to implement overlapping data caching for object APIs so that response data overlapping two or more requests can be retrieved from the cache.

In one or more embodiments, an object cache may be a distinct module that may store object responses $\{OR1, \ldots, ORN\}$ for API request sub-components $\{C1, \ldots, CN\}$. In accordance with the disclosed principles, an object request graph may be mapped onto the cache as a set of entries. The disclosed cache may be responsible for creating entries such as e.g., Entry<Key, Value>, and maintaining the relationships between API objects in accordance with the disclosed principles. This is an improvement over existing prior art cache systems, such as Memcached and Redis, which are data-agnostic and unaware of object relationships.

In one or more embodiments discussed below, given component sub-graphs $\{C1, \ldots, CN\}$ for a response graph $G1$, every node in the sub-graphs may be associated with an object identifier (ObjectId). In one or more embodiments, the disclosed cache may store sub-graph objects/components by the ObjectId, and may store the relationships between the components $\{C1, \ldots, CN\}$ as a related ObjectId Set $\{O1, \ldots, Om\}$. In one or more embodiments, the cache may store the entire response graph as an in-memory tree using primary keys (e.g., ObjectId) and or secondary keys (e.g., Set<ObjectId>).

An example computer implemented method for implementing an overlapping data cache is performed on a computing device executing an application program interface (API) gateway and comprises: inputting, over a network connection, an object API request from a client device, the API request comprising a query for data associated with one or more data services in communication with the API gateway; and parsing the object API request into one or more sub-components. For each sub-component, said method comprises: determining if the sub-component overlaps with a sub-component of a prior object API request, retrieving response data associated with the sub-component of the prior request from the overlapping data cache when it is determined that the sub-component overlaps with the sub-component of the prior object API request, and initiating a call to a data service of the one or more data service to receive response data associated with the sub-component when it is determined that the sub-component does not overlap with the sub-component of the prior object API request. The method further comprises returning to the client device a combined response to the API request, the combined response comprising any retrieved response data from the overlapping data cache and any received response data from the one or more data services.

FIG. 1 illustrates an example computing environment 100 that may be configured to implement overlapping data caching according to one embodiment of the present disclosure. As illustrated, computing environment may include a client device 120, an application gateway 130, a plurality of server locations 140, and a data store 170.

As illustrated, client device 120 may include a user interface 122 that allows users to interact with data and services provided by a software system via an object-based API, as described in further detail below. User interface 122 generally displays graphical user interface (GUI) elements that allow a user to request data from application servers 150 (in server locations 140₁, 140ₙ) via application gateway 130 or directly from a specific application server 150. Based on the selections received from user interface 122, client device 120 may generate a query transmitted to application gateway 130 (or a specific application server 150). Client device 120 may generate the query using a query format supported by application gateway 130 or a specific application server 150. For example, client device 120 may format the query as a RESTful query, a GraphQL query, a custom query language, or in any other format supported by application gateway 130 or a specific application server 150.

Client device 120 generally receives data from application gateway 130 (or a specific application server 150) to display in one or more graphical elements in user interface 122. Client device 120 can subsequently display the data in graphical elements in user interface 122. In some cases, user interface 122 may allow a user to generate additional queries based on data provided by application gateway 130 or a specific application server 150.

Application gateway 130 is generally configured to receive requests for data from a client device 120 (i.e., queries composed in user interface 122), process requests, and provide data to the client device 120. As illustrated, application gateway 130 includes API service 132. Application gateway 130 may be configured to perform/coordinate the overlapping data caching process disclosed herein and discussed below in more detail.

In addition, API service 132 may build a projection of the API based on API schema 172 stored at schema data store 170. The graph projection of the API may provide, for example, a structure that allows an API service 132 to interact with the API (e.g., using a request indicating a navigable path through the graph projection of the API). The structure may represent, for example, a protocol binding for a request protocol that allows API service 132 to respond to requests by identifying nodes in the graph projection of the API and the associated data sources to interact with. To build a projection of the API, API service 132 may examine the schema definitions for each node defined in the API. The schema definition for each node defined in the API generally includes the name of the node, relationships to one or more parent nodes, functions supported by a node, and so on. The projection of the API corresponds to a hierarchy of nodes from the graph with "n" levels starting from a root node. API service 132 may begin with a single root node in a graph projection of the API, and as API service 132 reads schema definitions for each node, API service 132 can add an identifier representing the node (e.g., the node name) to an appropriate place (level) in the graph. For example, API service 132 may add a first-level node in the graph linked to the root node for a schema definition that identifies a node's parent as the root node. If API service 132 reads a schema definition for a child node with a parent node that is not currently represented in the graph, API service 132 can search API schema 172 for the schema definition of the identified parent node. API schema 172 can add the identified parent node to the appropriate level in the graph and add the child node to the graph at a level below the parent node.

In some cases, where data is cached (or denormalized) across a number of cloud locations 140, API service 132 may designate a cloud location as a master node for a particular type or class of data. Cloud locations 140 that cache the same data may periodically update the cached data with the data stored at the designated master node. When API service 132 receives a request for data that is stored at the designated master node and cached at one or more other cloud locations 140, API service 132 can identify the cloud location to process the query based, for example, on historical access patterns. In some cases, API service 132 can route the query to a cloud location 140 that is not the designated master node for at least some of the data requested by the query. Because data can be denormalized and replicated across various cloud locations 140, API service 132 can route the query to a single cloud location 140 for execution instead of dividing the query into multiple independent queries for processing. API service 132 can select the cloud location 140 to process a query, for example, based on the number of data points for which the cloud location 140 is identified as a master node, historical performance data for the cloud locations 140, and so on.

In some cases, API service 132 can monitor historical access patterns to identify cloud locations 140 that can cache data from other cloud locations 140 to optimize read operations. For example, assume that three different items are commonly requested in a single request received at API service 132, with the first and third items stored at a first cloud location 140₁ and the second item stored at a second cloud location 140₂. Because the three items are commonly requested as a result of a single request received at API service 132, API service 132 can instruct either the first cloud location 140₁ or the second cloud location 140₂ to cache data such that the request can be satisfied by processing a query at one of the cloud locations 140₁ or 140₂. API service 132 can identify the cloud location at which data is to be cached, for example, based on an amount of data to cache and verify for consistency issues (e.g., performing data caching at the cloud location that is the designated master node for a larger amount of commonly requested data).

Server location 140 may be a geographically distinct location at which data and associated data processing routines may be stored. In a distributed system, different types of data may be stored in different locations to satisfy, for example, data privacy requirements for different countries and so on. Each server location 140 may include an application server 150 and data store 160.

Application server 150 generally includes a request processor 152. Request processor 152 may receive a query from API service 132 at application gateway 130 for processing. The query may be, for example, an API call or a database query including one or more parameters provided in the request received at application gateway 130 or obtained from other data sources (e.g., from a separate query executed on a different application server 150). In some cases, application server 150 at first server location 140₁ can directly request data from second server location 140₂. Application server 150 at first server location 140₁ can determine whether or not a direct access to application server 150 at second server location 140₂ is allowed based on data included in the API schema definition for services provided by application server 150 at second server location 140₂.

Based on the query received from API service 132, request processor 152 may execute a query on user data 162 in data store 160 for the requested data. In some cases, request processor 152 may additionally include other logic for processing the requested data before transmitting the requested data to application gateway 130.

Data store 160 generally is a repository storing data that request processor 152 can access to satisfy requests for data received at application server 150. The requests for data, as discussed above, may be received from API service 132 at application gateway 130 or from another application server 150 in a second server location 140₂ if the API schema indicates that application server 150 at first server location 140₁ allows for direct querying of data from a different application server. As illustrated, data store 160 generally includes user data 162 in a sortable and searchable state. In response to a query received from request processor 152 at application server 150, data store 160 can return a set of data matching the parameters included in the request, and request processor 152 may perform additional processing on the returned data before providing the data to a client device 120 via API service 132 at application gateway 130.

Schema data store 170 generally is a repository for storing schema definition files for each node, or query, available in an API. As illustrated, schema data store 170 includes API schema 172. Data stored in API schema 172 may define one or more functions provided by the API.

Figure 2A:
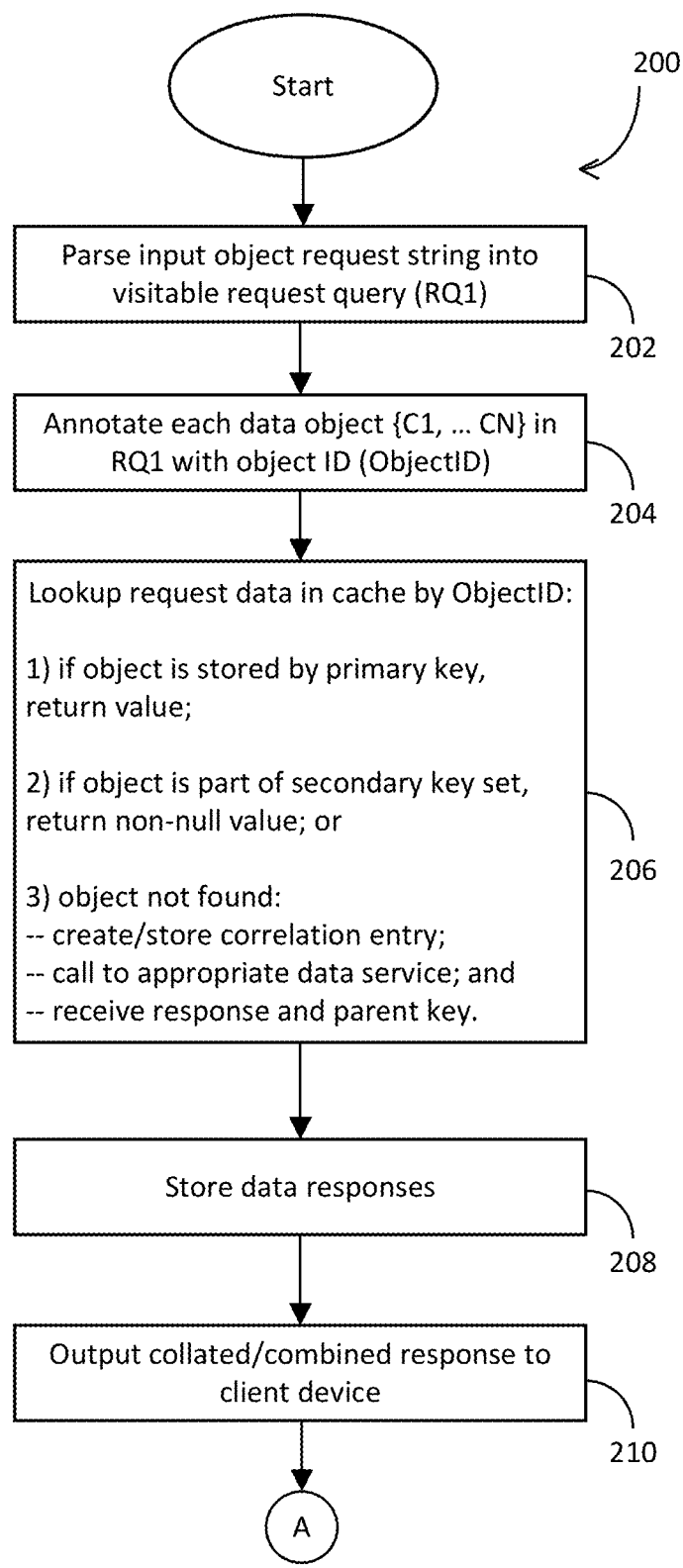
FIGS. 2A-2B show an example process for implementing overlapping data caching according to an embodiment of the present disclosure.
Figure 2B:
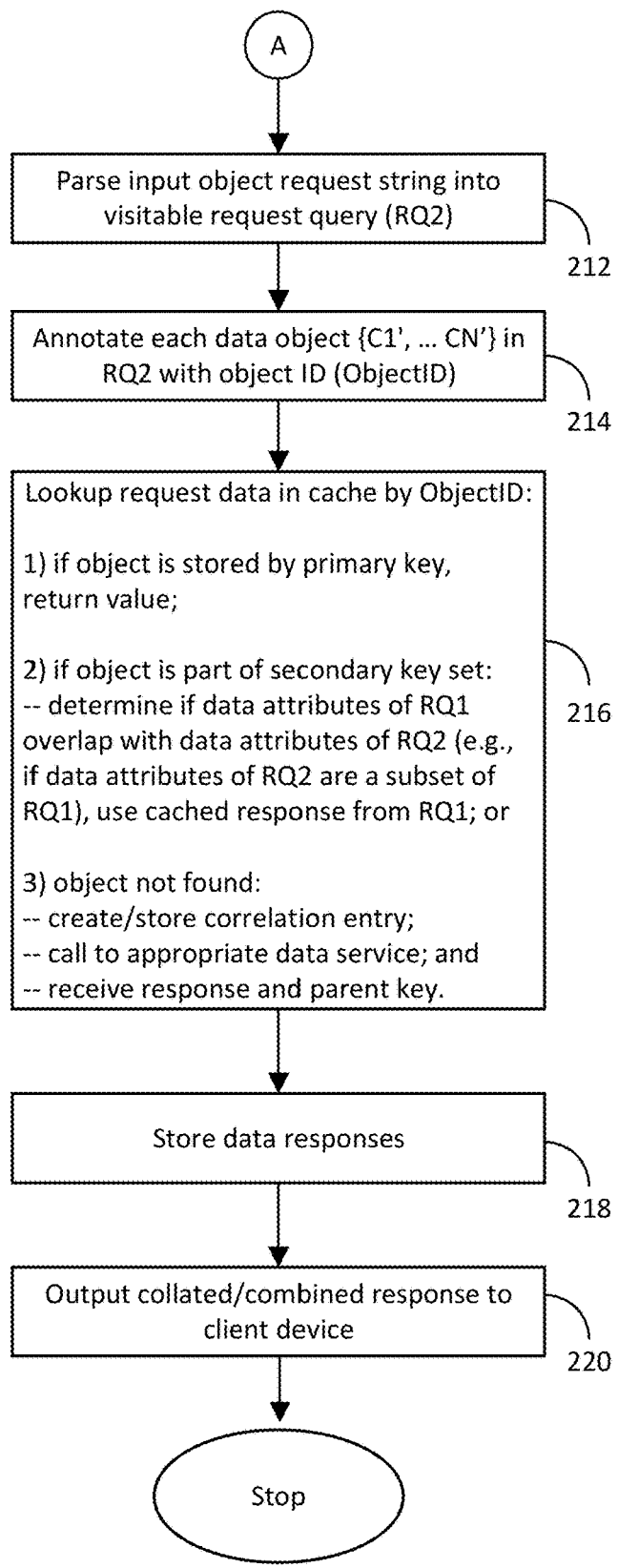

FIGS. 2A-2B show an example process 200 for implementing overlapping data caching according to an embodiment of the present disclosure. The disclosed process 200 may be performed by the application gateway 130 and the physical cache may be distributed throughout the environment 100 as discussed above. The process 200 may begin when a client device (e.g., client device 120) issues an object API request to the application gateway 130 (i.e., the gateway 130 inputs the object API request). At step 202, the process may parse the input object request into a visit-able query request query (RQ1). For example, an object request string may be input and the API gateway may use a parsing library to parse an the request into the visit-able request query (RQ1) as known in the art. The result of step 202 may be an in-memory graph-of-objects for RQ1 that can be traversed using a visitor object.

At step 204, the process 200 may annotate each data object {C1, . . . , CN} in the graph-of-objects for RQ1 with an object identifier (ObjectId). For example, given a visitor, the graph-of-objects for RQ1 is traversed and each data object in the graph-of-objects is discovered. For-each data object, the process 200 may assign it an ObjectId. In accordance with the disclosed principles, an ObjectId may be unique across the entire system 100. For example, given a subcomponent C1 in the graph RQ1, and sub-component C2 in a second graph RQ2, ObjectId(C1) may be equal to ObjectId(C2) if C1 and C2 have the same recursive set of attributes. In other words, two data objects with the same set of fields across two or more API requests have the same ObjectId.

At step 206, the process 200 may lookup request data by ObjectId. As noted above, the components/objects {C1, . . . , CN} of RQ1 are annotated with ObjectIds. In accordance with the disclosed principles, for a particular visitor, each data object {C1, . . . , CN} within the RQ1 is examined. It should be appreciated that a data object may be: 1) stored directly in the cache by its ObjectId (e.g., by a primary key); 2) stored as part of a Set<ObjectId> (e.g., by a secondary key); or 3) not stored.

In accordance with the disclosed principles, when a data object is stored by its primary key, step 206 may return the cached value. In addition to, or alternatively, when a data object is part of a secondary key set, any non-null value from the set may be returned at step 206, if one is found.

Otherwise, when a data object is not found in cache, the process 200 at step 206 may create a correlation entry Entry<CorrelationId, Request>. The correlation entry Entry<CorrelationId, Request> may then be stored in the cache. In one embodiment, the CorrelationId is defined as a unique identifier shared between an object {C1, . . . , CN} and a potential data response. In accordance with the disclosed principles, when data responses from downstream services are evaluated, the CorrelationId may be used to find information about the originating request.

Continuing at step 206, when a data object is not found in cache, the process 200 may request data from the appropriate downstream service as known in the art. For example, the API Gateway 130 may make e.g., an HTTP call to a registered data service. The data service may respond with the requested data for the subcomponent (e.g., CN (DataResponse)), or with errors explaining why it cannot serve the data. In addition, each data service may return a parent key. In accordance with the disclosed principles, the returned parent key may be the component's ObjectId, which may identify which data object node is the parent to the data response.

To sum up step 206, the disclosed API Gateway 130 decomposes RQ1 into request sub-components {C1, . . . , CN}. Any component that can be served from cache gets response data values from cache. For each component that cannot be served from cache, the API Gateway 130 may make e.g., an HTTP call to a registered data service. The data service may respond with the requested data and a parent key. The outputs of step 206 therefore may include response data and a list of tuples comprising: CorrelationId, parent key, request sub-component and data responses.

At step 208, the process 200 may store the data responses from step 206 by primary or secondary keys. In one or more embodiments, data responses are either single responses or compound responses. For example, a data response may be a single response and stored in the cache by its primary key if it has a single ObjectId associated with it. For example, if the received query asked for "The single Company Object with name equals Intuit," then only a single ObjectId is returned in the data response. When a data response is compound, it has multiple ObjectIds associated with it. For example, if the received query asked for "Any company Object with names in the set {Intuit, Oracle, Facebook}" or asked for "Any company Object with ParentKey==12345," multiple ObjectIds may be returned.

In accordance with the disclosed principles, to determine whether a data response is single or compound, the process 200 may look up the originating request query in the cache by one or more correlation identifiers CorrelationId. In addition, for each case, a cache entry Entry<ObjectId, DataResponse> is created and stored in the cache. If the data response is compound, then for-each data object in the data response, a secondary key may be created. The secondary key may be represented as follows: SecondaryKey=Hash (TypeId(DataObject), ParentKey, ParentValue), where TypeId(DataObject) may represent the type of the data object, ParentKey may be the parent key, and ParentValue is the value of the parent. In addition, a secondary cache entry is created Entry<SecondaryKey, Pair<OriginalQuery, ObjectId>> and stored in the cache. The final result is that at least one data response may be stored in the cache by primary key. For the compound case, the set of secondary keys may also be stored in cache along with the original query to be compared later in accordance with the disclosed principles.

At step 210, the process 200 (via the API Gateway 130) collates (e.g., combines) all of the data responses into a single response, with at least response data and error sections. The single response may then be output to the client device.

At step 212, it is presumed that a client device (e.g., client device 120) issues a second object API request to the application gateway 130. At step 212, the process 200 may parse the input object request into a second visit-able query request query (RQ2). This may be performed in the same manner discussed above with respect to step 202. The result of step 212 may be an in-memory graph-of-objects for RQ2 that can be traversed using a visitor object.

At step 214, the process 200 may annotate each data object {C1', ..., CN'} in the graph-of-objects for RQ2 with an object identifier (ObjectId). This may be performed in the same manner discussed above with respect to step 204.

At step 216, the process 200 may determine whether one or more sub-component {C1', ..., CN'} of RQ2 are in the cache. In one embodiment, this may be done using the ObjectId for each sub-component. If it is determined that there is a cache hit (i.e., a match), the data for that sub-component is returned from the cache.

If there is no direct cache hit, the process 200 may generate all secondary keys for RQ2 and look for each of them in the cache. If any of the secondary key lookups result in a cache hit, the process 200 may return an secondary cache entry e.g., Entry<SecondaryKey, Pair<Query, ObjectId>>, where "Query" is the stored value of RQ2 that resulted in the cache miss. In accordance with the disclosed principles, AttributeSet1 may be the set of requested data attributes from RQ1, and AttributeSet2 may be the set of requested data attributes from RQ2. If AttributeSet2 is a subset of AttributeSet1, then the matching data response for RQ1 contains at least the necessary data for RQ2. If AttributeSet2 is a subset of AttributeSet1, the process 200 may use the appropriate response data used for RQ1 as the data response for RQ2. For example, if the first query asked for the data attributes {Name, Age, Address, Phone Number} in RQ1, and there was a cache miss and stored data response for that query, and the second query asked for {Name, Address} in RQ2, then {Name, Address} is a subset of {Name, Age, Address, Phone Number}. In accordance with the disclosed principles of the overlapping cache scheme, the process 200 at step 216 may presume that it is proper to serve the response data from RQ1 for the RQ2 response.

At step 218, the process 200 may store the data responses from step 216 by primary or secondary keys in the same manner discussed above for step 208. At step 220, the process 200 (via the API Gateway 130) may collate (e.g., combine) all of the data responses into a single response. The single response may then be output to the client device.

Figure 3:
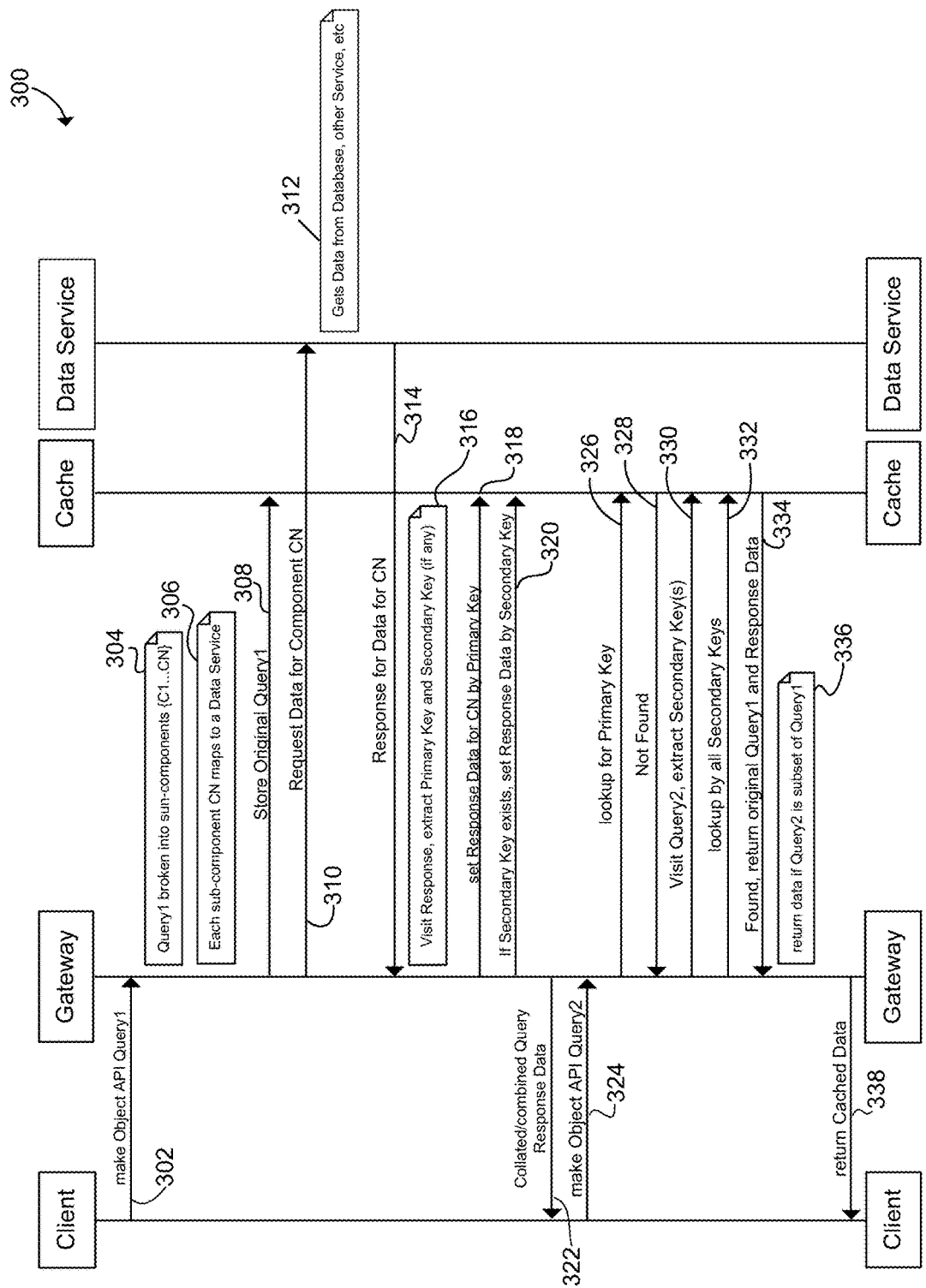
FIG. 3 shows an example system flow illustrating the overlapping data caching according to an embodiment of the present disclosure.

This disclosed principles are now described with reference to FIG. 3, which shows an example system flow 300 illustrating the overlapping data caching scheme according to an embodiment of the present disclosure. In the illustrated example, at step 302 a first object API query ("Query1") may be sent by a Client to the Object API Gateway. At step 304, the Gateway may de-compose Query1 into sub-components {C1, ..., CN}. As shown by step 306, each sub-component {C1, ..., CN} may be mapped to a Data Service. At step 308, the original query Query1 is stored in the Cache, and the API Gateway looks up the sub-components {C1, ..., CN} in the Cache by primary or secondary key(s). In the illustrated example, it is presumed that there is no data in the Cache (i.e., a Cache Miss). Accordingly, at step 310 the Gateway makes a request to the downstream Data Service (e.g., via an HTTP call) to retrieve the data (per sub-component).

At step 312, the Data Service retrieves the appropriate response data from e.g. a database or other service. At step 314, the Data Service returns the Response Data for the relevant sub-component {C1, ..., CN}. At steps 316-320, the retrieved Response Data is stored in the Cache in accordance with the disclosed principles. For example, Primary and Secondary Keys, if any, are extracted at step 316; Response Data for each sub-component {C1, ..., CN} may be set by Primary Key at step 318; and or if Secondary Keys exist, Response Data may be set by Secondary Key at step 320. At step 322, the Gateway collates (e.g., combines) the responses for {C1, ..., CN} into a single data response with the Response Data and returns it to the Client.

In the illustrated example, at step 324, a second object API query ("Query2") may be sent by the Client to the API Gateway. At step 326, the Gateway may de-compose Query2 into sub-components (e.g., {C1', ..., CN'}) and may look them up in the Cache by Primary Key. In the illustrated example, this results in a Cache Miss at step 328. At step 330, Query2 is visited, and any Secondary Keys are extracted as discussed above. At step 332, the sub-components are looked up in the Cache by the Secondary Keys. In accordance with the disclosed principles, if the intersection of {C1, ..., CN} and {C1', ..., CN'} is not empty (i.e., the different Query sub-components overlap), the disclosed process may potentially retrieve the matching Response Data from the Cache. For the overlapping sub-components in the intersection (e.g., InterSection({C1, ..., CN}, {C1', ..., CN'})), if |CN|>=|CN'|, then CN' is asking for a subset of the data stored in the Cache for CN; as such, it is proper to retrieve Query1 Response Data at step 334 and return that data at step 336.

The API Gateway collates the responses for {C1', ..., CN'} into a single data response and returns it as Response Data to the Client at step 338. Assuming the Intersection Set is non-empty, at least some of the data in the collated Response may come from the Cache.

Figure 4:
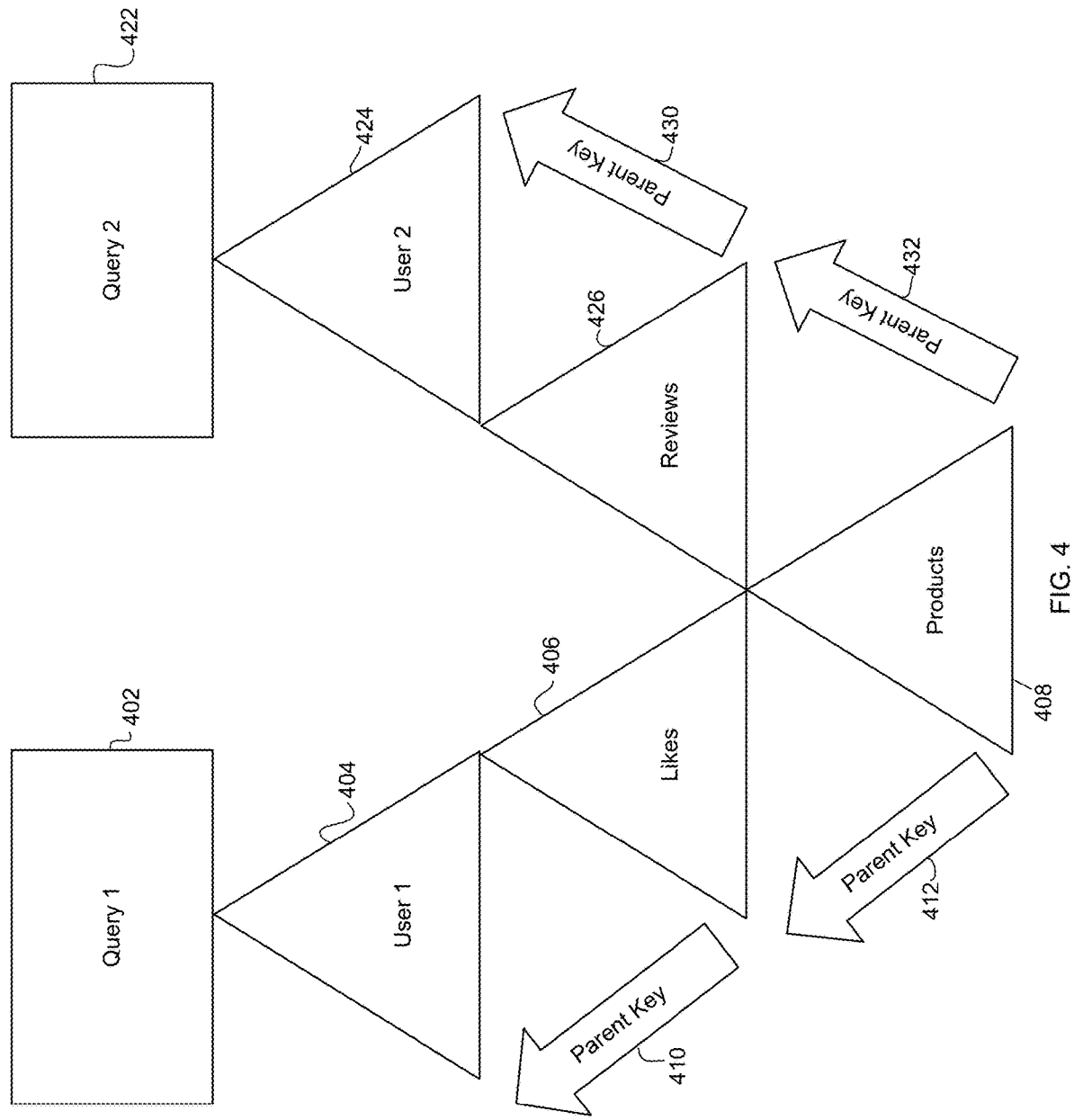
FIG. 4 shows an example of overlapping query caching in accordance with the disclosed principles.

FIG. 4 shows an example of overlapping query caching in accordance with the disclosed principles. The illustrated example shows two example API request queries 402, 422. The first query 402 is labeled "Query 1" and asks for "User.Likes.Products." The first query 402 may be broken down into three sub-components 404, 406, 408, respectively identified as "User 1," "Likes" and "Products." The example illustrates two parent keys 410, 412 for the sub-components of the first query 402.

In the illustrated example, the second query 422 is labeled "Query 2" and asks for "User.Reviews.Products." The second query 422 may be broken down into three sub-components 424, 426, 408, respectively identified as "User 2," "Reviews" and "Products." The example illustrates two parent keys 430, 432 for the sub-components of the second query 422.

In the illustrated example, there is an overlap between the first and second queries 402, 422 for the "Products" sub-component 408. Thus, in accordance with the overlapping cache principles disclosed herein, response data from Query 1 associated with the "Products" sub-component 408 can be used to satisfy for the "Products" sub-component 408 for Query 2.

Figure 5:
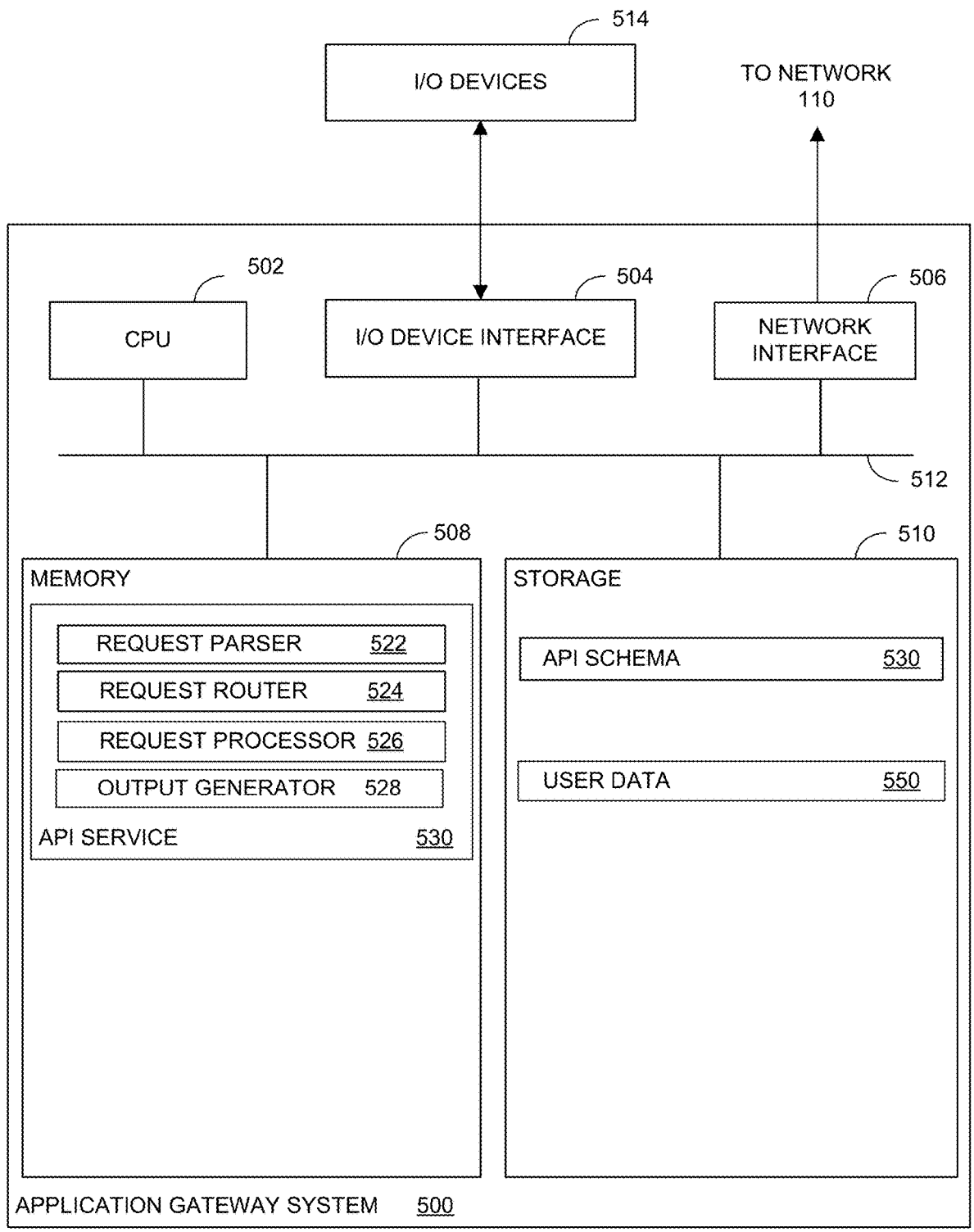
FIG. 5 shows an example application gateway system that may be used for implementing overlapping data caching according to an embodiment of the present disclosure.

FIG. 5 illustrates an example application gateway system 500 for implementing the overlapping cache processing according to an embodiment. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes an API service 520. API service 520 generally receives a request for data from a client device 120, parses the request into one or more subqueries, and provides data to the client device 120 in response to the request. As illustrated, API service 520 generally includes a request parser 522, request router 524, request processor 526, and an output generator 528.

Request parser 522 is generally configured to decompose a received request into multiple parts based on a set of delimiters defined for a format of the request (e.g., the forward slash character for RESTful requests, levels of indentation for JSON-like requests, and so on). After decomposing a received request into multiple parts, request parser 522 can generate one or more subqueries from the parts and determine whether or not the generated queries constitute valid queries. As discussed above, a valid query generally includes parameters that are defined in an associated schema as required parameters for the query and generally can be located in a graph projection of the API using a continual path through the graph projection.

If request parser 522 determines that a subquery is valid, request parser 522 can provide the subquery to request router 524 to be routed to the appropriate system for processing. Request router 524 can examine the schema definition for the node associated with the subquery. Based on provider information in the schema definition, request router 524 can route the subquery to the appropriate system for processing. If the provider information in the schema definition indicates that the subquery is to be processed at application gateway 500, request router 524 can provide the subquery to request processor 526 for processing. Otherwise, request router 524 can transmit the subquery to the identified application server 150 via network interface 506.

In some cases, request router 524 may examine the one or more subqueries generated by request parser 522 for potential optimization (e.g., to reduce a number of subqueries generated and routed to different cloud locations 140 to satisfy the request received at application gateway 500). Request router 524 may include a read query optimizer that can reduce the number of queries routed to different cloud locations 140 for execution. For example, a read query optimizer in request router 524 can direct read queries to cloud locations including denormalized data and can replace multiple read queries directed to a specific cloud location 140 with a single query fragment encompassing the multiple read queries.

Request processor 526 is generally configured to receive subqueries from request router 524 for processing. To process a request, request processor 526 can examine data located in storage 510 (e.g., user data 550) or at a remote location for data matching the parameters included in a subquery, if any, received from request router 524. In response to the query, request processor 526 can generate a result set including the requested data (or a null data set, if no data matches the parameters included in the subquery) and transmit the result set to output generator 528 for caching and/or output to a client device 120.

Output generator 528 is generally configured to receive data in response to one or more subqueries routed to an application server 150 by request router 524. Output generator 528 can cache the results of a subquery for use by request parser 522 in generating subsequent queries. When request router 524 routes the last subquery in the request to the appropriate application server 150 identified in the schema definition for a node corresponding to the subquery, output generator 528 receives a data set to be returned to the requesting client device 120. In some cases, output generator 528 can serialize the data set received from application server 150 into a parseable data format for display in user interface 122 on the requesting client device 120.

As shown, storage 510 includes API schema 530 and user data 550. API schema 530 generally provides a data store that includes schema definition files for each of the nodes in a graph projection of the API. As developers add extensions to the API, additional schema definition files may be committed to API schema 530. In some cases, API schema 530 can additionally store a graph projection of the API, which may be updated over time as developers add extensions to the API.

User data 550 generally includes data that application gateway system stores for an application and can provide in response to a query received at request processor 526. User data 550 may be maintained, for example, in a relational database, and request processor 526 can execute database queries on user data 550 based on the parameters included in a subquery. In some cases, user data 550 may be maintained in a non-relational data store, and request processor can generate queries for user data 550 based on, for example, key-value pairs or other data points.

The disclosed principles provide several advantages over the existing API gateway and caching art. For example, one known system, referred to as Apollo®, relates to GraphQL Systems and uses a client-side GraphQL cache that uses primary keys to look up response data as a flat list. The disclosed principles are different in several key aspects: First, the disclosed principles are protocol-independent; that is, the disclosed principles can store overlapping data responses for any object API system (e.g., GraphQL, Intuit Batch®, and REST responses). Moreover, the disclosed overlapping caching scheme maintains an in-cache tree of overlapping response data for request sub-components, not a flat list as used in the prior art. In addition, the disclosed overlapping cache supports lookups by both Primary Key and Secondary Keys. Furthermore the disclosed overlapping cache is a "Central Cache" on the object API Gateway, not a client-side cache. As can be appreciated, a goal of the disclosed principles is to maximize the shared cache data across many different products and services. Moreover, in one or more embodiments, the disclosed overlapping cache may be is integrated with an object access control module to prevent unauthorized data access.

While primary key caching is the current industry-standard, the disclosed overlapping cache scheme is unique and novel because it seamlessly maintains a tree of query and data responses in cache using secondary keys as links. For any number of object API Requests, if any sub-component part of the request is held in the cache by primary or secondary key, and the client is authorized to retrieve that data, the disclosed principles may serve the data from the overlapping cache. As can be appreciated, completely disparate requests from different products and services can utilize the overlapping cache disclosed herein as long as at least one request sub-component is held in the cache. As can be appreciated, the overlapping cache disclosed herein is agnostic to the request protocol. It works on an independent internal expression language, and projects onto request protocols like GraphQL, REST and Intuit Batch. The disclosed overlapping cache scheme does not rely on any semantics or fields other than the system-unique ObjectId in accordance with the disclosed principles.

As can be appreciated, the principles disclosed herein will achieve faster processing by reducing calls to external data services, and thereby reducing latency typically incurred by current API gateways and caching schemes. The reduction in calls to external data services also reduces network traffic and frees up other resources associated with the setup and processing of e.g., an HTTP call to a registered data service. These are major improvements in the technological art as they may improve the functioning of the computer and are an improvement to computer-rooted technology and the technical fields of API gateways and caching systems.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for implementing an overlapping data cache, said method being performed on a computing device executing an application program interface (API) gateway, said method comprising:
   inputting, over a network connection, an object API request from a client device, the object API request comprising a query for data associated with one or more data services in communication with the API gateway;
   parsing the object API request into one or more sub-components;
   for each sub-component, said method comprises:
      determining if the sub-component overlaps with a sub-component of a prior object API request by determining that there are one or more secondary cache keys associated with the sub-component and the sub-component of the prior object API request, and that data attributes of the sub-component are a subset of data attributes of the sub-component of the prior object API request,
      retrieving response data associated with the sub-component of the prior request from the overlapping data cache when it is determined that the sub-component overlaps with the sub-component of the prior object API request, and
      initiating a call to a data service of the one or more data service to receive response data associated with the sub-component when it is determined that the sub-component does not overlap with the sub-component of the prior object API request; and
   returning to the client device a combined response to the API request, the combined response comprising any retrieved response data from the overlapping data cache and any received response data from the one or more data services.

2. The method of claim 1, wherein parsing the object API request into one or more sub-components further comprises assigning an object identifier to each sub-component.

3. The method of claim 2, wherein the object identifier is used as a primary cache key when there is a cache hit based on the object identifier.

4. The method of claim 2, further comprising creating a cache entry associating the object identifier and the received data response.

5. The method of claim 1, further comprising creating a cache correlation identifier for the sub-component.

6. The method of claim 5, further comprising determining whether a data response is a single data response or a compound data response using the cache correlation identifier.

7. The method of claim 5, further comprising:
   determining that a data response is a single data response based on the cache correlation identifier;
   creating a primary cache key for the data response; and
   storing the primary cache key in the overlapping data cache.

8. The method of claim 5, further comprising:
   determining that a data response is a compound data response based on the cache correlation identifier;
   creating one or more secondary cache keys for the data response; and
   storing the one or more secondary cache keys in the overlapping data cache.

9. A system for implementing an overlapping data cache, said system comprising:
   a computing device executing an application program interface (API) gateway, the computing device being in communication with the overlapping data cache and being configured to:
      input, over a network connection, an object API request from a client device, the object API request comprising a query for data associated with one or more data services in communication with the API gateway;
      parse the object API request into one or more sub-components;
      for each sub-component, the computing device is further configured to:
         determine if the sub-component overlaps with a sub-component of a prior object API request by determining that there are one or more secondary cache keys associated with the sub-component and the sub-component of the prior object API request, and that data attributes of the sub-component are a subset of data attributes of the sub-component of the prior object API request, retrieve response data associated with the sub-component of the prior request from the overlapping data cache when it is determined that the sub-component overlaps with the sub-component of the prior object API request, and initiate a call to a data service of the one or more data service to receive response data associated with the sub-component when it is determined that the sub-component does not overlap with the sub-component of the prior object API request; and return to the client device a combined response to the API request, the combined response comprising any retrieved response data from the overlapping data cache and any received response data from the one or more data services.

10. The system of claim 9, wherein the computing device is configured to parse the object API request into one or more sub-components by assigning an object identifier to each sub-component.

11. The system of claim 10, wherein the computing device is configured to use the object identifier as a primary cache key when there is a cache hit based on the object identifier.

12. The system of claim 10, wherein the computing device is configured to create a cache entry associating the object identifier and the received data response.

13. The system of claim 9, wherein the computing device is configured to create a cache correlation identifier for the sub-component.

14. The system of claim 13, wherein the computing device is configured to determine whether a data response is a single data response or a compound data response using the cache correlation identifier.

15. The system of claim 13, wherein the computing device is configured to:

determine that a data response is a single data response based on the cache correlation identifier;

create a primary cache key for the data response; and store the primary cache key in the overlapping data cache.

16. The system of claim 13, wherein the computing device is configured to:

determine that a data response is a compound data response based on the cache correlation identifier;

create one or more secondary cache keys for the data response; and store the one or more secondary cache keys in the overlapping data cache.

17. A system for implementing an overlapping data cache, said system comprising:

a computing device executing an application program interface (API) gateway, the computing device being in communication with the overlapping data cache and being configured to:

input, over a network connection, an object API request from a client device, the object API request comprising a query for data associated with one or more data services in communication with the API gateway;

parse the object API request into one or more sub-components;

for each sub-component, the computing device is further configured to:

determine if the sub-component overlaps with a sub-component of a prior object API request by determining that there one or more secondary cache keys associated with the sub-component and the sub-component of the prior object API request that is based on an object identifier assigned to the sub-component and the sub-component of the prior object API request, retrieve response data associated with the sub-component of the prior request from the overlapping data cache when it is determined that the sub-component overlaps with the sub-component of the prior object API request, and initiate a call to a data service of the one or more data service to receive response data associated with the sub-component when it is determined that the sub-component does not overlap with the sub-component of the prior object API request; and return to the client device a combined response to the API request, the combined response comprising any retrieved response data from the overlapping data cache and any received response data from the one or more data services.

18. The system of claim 17, wherein the computing device is configured to use the object identifier as a primary cache key when there is a cache hit based on the object identifier.

19. The system of claim 17, wherein the computing device is configured to create a cache entry associating the object identifier and the received data response.

20. The system of claim 17, wherein the computing device is configured to create a cache correlation identifier for the sub-component.

* * * * *